United States Patent [19]

Okamoto

[11] Patent Number: 4,663,888
[45] Date of Patent: May 12, 1987

[54] CONSTRUCTION OF DOOR GLASS GUIDE IN MOTOR VEHICLE

[75] Inventor: Yuji Okamoto, Toyota, Japan

[73] Assignee: Toyota Jidosha Kabushiki Kaisha, Toyota, Japan

[21] Appl. No.: 706,616

[22] Filed: Feb. 28, 1985

[30] Foreign Application Priority Data

| Mar. 1, 1984 | [JP] | Japan | 59-29750[U] |
| Aug. 21, 1984 | [JP] | Japan | 59-126866[U] |
| Aug. 21, 1984 | [JP] | Japan | 59-126867[U] |
| Aug. 21, 1984 | [JP] | Japan | 59-126870[U] |

[51] Int. Cl.⁴ .................. E05D 15/16; E06B 7/16
[52] U.S. Cl. .............................. 49/441; 49/488
[58] Field of Search .................... 49/441, 488, 489

[56] References Cited

U.S. PATENT DOCUMENTS

| 3,401,075 | 9/1968 | Jackson | 49/441 X |
| 3,807,978 | 4/1974 | Niemanns | 49/441 |
| 4,457,111 | 7/1984 | Koike | 49/441 |

Primary Examiner—Philip C. Kannan
Attorney, Agent, or Firm—Finnegan, Henderson, Farabow, Garrett & Dunner

[57] ABSTRACT

A construction of a door glass guide in a motor vehicle, comprising a door glass run including a main body of the door glass run secured to a guide portion of a door frame, being opposed to an end edge of a door glass and lips, which are extending from end portions directed to the center of the door glass toward the center of the main body of the door glass run in the widthwise direction thereof and toward the outer periphery of the door frame, being in sliding contact with the glass surfaces at the end edge of the door glass, and guiding the door glass in the opening or closing direction, wherein there is provided a spacer being opposed to at least a portion of the door glass run in the longitudinal direction, disposed between one of the lips and the main body of the door glass run in the rear of the lip in the direction of the thickness of the door glass, and regulating the deformation of the lip in the widthwise direction of the door glass run.

24 Claims, 21 Drawing Figures

CONSTRUCTION OF DOOR GLASS GUIDE IN MOTOR VEHICLE

BACKGROUND OF THE INVENTION

1. Field of the Invention

This invention relates to a construction of a door glass guide, and particularly to improvements in a construction of a door glass guide provided in a door frame of a motor vehicle's door with the door frame.

2. Description of the Prior Art

As shown in FIGS. 16 through 19, a construction of a door glass guide in a motor vehicle with a door frame is normally of such arrangement that a door glass run 3 being a generally U-shape in cross section is provided in a guide portion 2 of a door frame 1, whereby the door glass run 3 guides the front or rear end edge of a door glass 4 and restrains the same in a direction of thickness of the door glass 4.

Here, the door glass run 3 is provided with an outer lip 3A and an inner lip 3B, both of which are obliquely extending from the forward end portion of the U-shaped section toward the center of the section. The outer lip 3A and the inner lip 3B are brought into sliding contact with the inner and outer surfaces of the front or rear end edge 4A of the door glass 4, so as to guide the door glass 4 in the opening or closing direction.

The outer lip 3A and the inner lip 3B are elastically deformable within a predetermined range in the direction of the thickness of the door glass 4.

Figure 20:
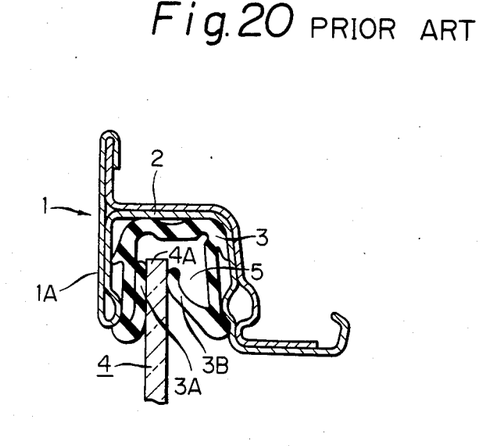
FIG. 20 is a sectional view similar to FIG. 4, showing the conventional construction of the door glass guide in a motor vehicle.

In consequence, if an outwardly pushing force acts on the door glass 4 for example, then the door glass 4 outwardly pushes the outer lip 3A to deform the same, as shown in FIG. 20.

Figure 19:
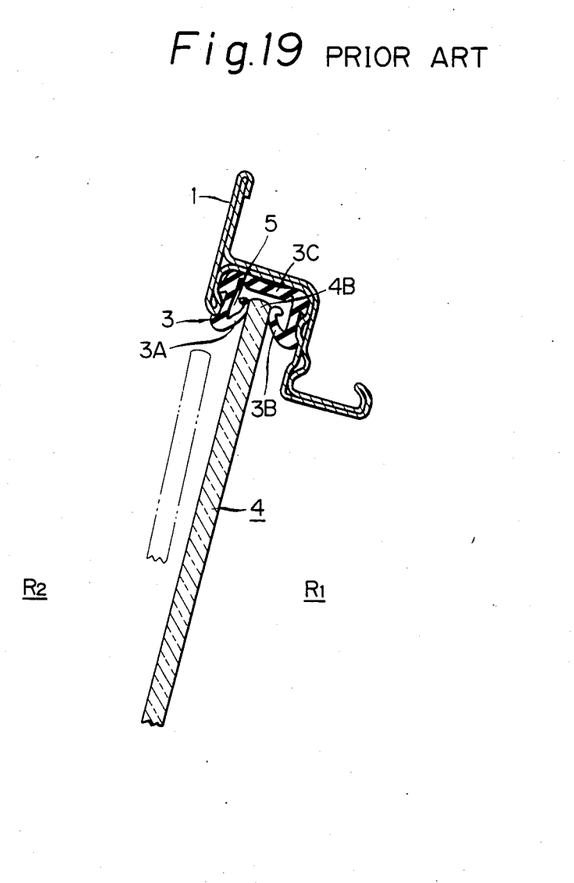
FIG. 19 is a sectional view corresponding to the line XIX—XIX in FIG. 16, showing the above-mentioned door construction.

Now, when the motor vehicle runs at high speed, air flows along the side surfaces of a vehicle body become high, whereby the outside R2 of a vehicle compartment is lower in pressure than inside R1 of the compartment as indicated in FIG. 19, so that such a phenomenon occurs that the door glasses 4 are sucked outwardly from the vehicle body.

Figure 16:
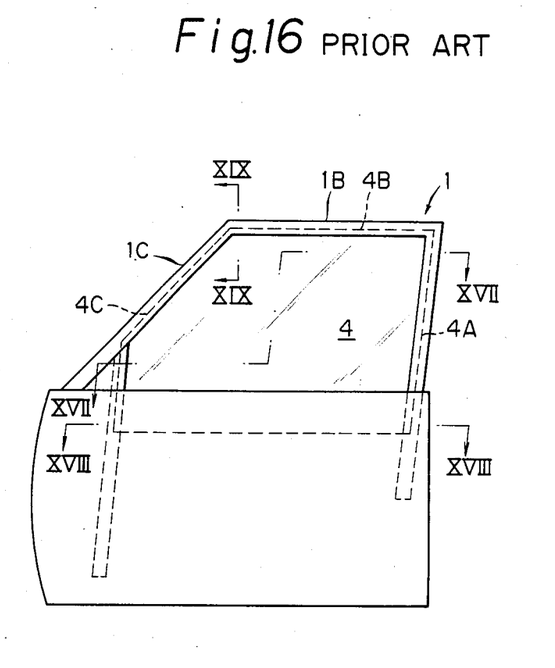
FIG. 16 is a side view showing a construction of a conventional door in a motor vehicle.

In consequence, in the motor vehicle equipped with the door having the door frame 1, if the door glass 4 is to be raised or lowered during the running of the motor vehicle at high speed, then the door glass 4 is sucked outwardly from the vehicle body as indicated by hypothetical lines in FIG. 19. As the result, an upper side edge 4B and an oblique edge 4C of the door glass 4 move outwardly from the vehicle body, thus presenting such a disadvantage that both edges 4B and 4C as shown in FIG. 16, do not run smoothly into the door glass run 3 coupled into an upper side portion 1B and an oblique side portion 1C of the door frame 1.

Figure 17:
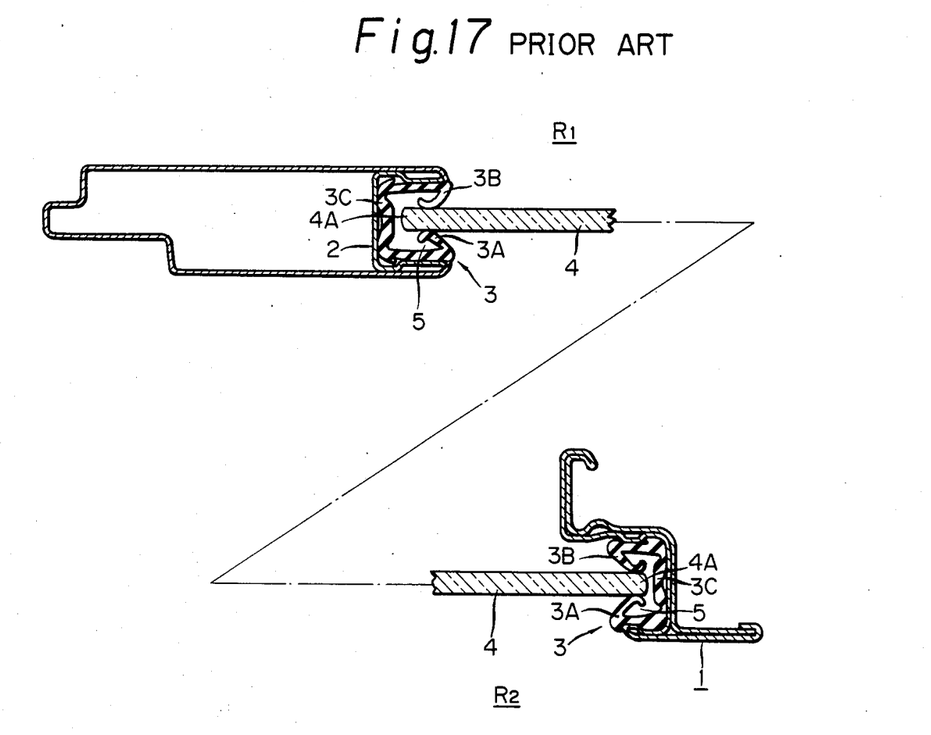
FIG. 17 is a sectional view corresponding to the line XVII—XVII in FIG. 16, showing the conventional door construction in a motor vehicle.
Figure 18:
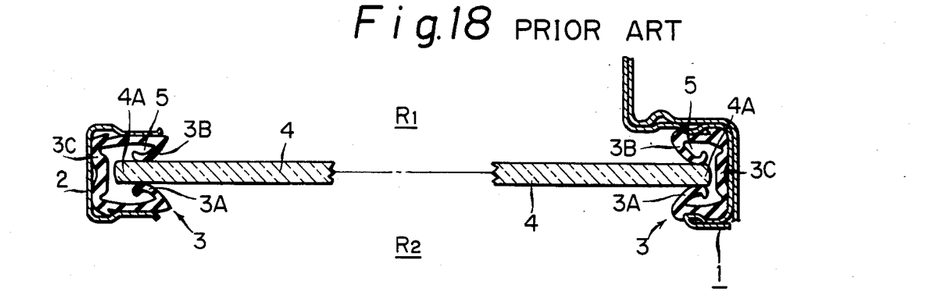
FIG. 18 is a sectional view corresponding to the line XVIII—XVIII in FIG. 16, showing the above-mentioned door construction.

The reason is that, in the conventional door glass run 3, there are gaps 5 formed between the inner lip 3B and a base portion 3C of the door glass run 3 and between the outer lip 3A and the base portion 3C of the door glass run 3, whereby, when a force sucking outwardly from the vehicle body acts on the door glass 4 during the running of the motor vehicle at high speed, both lips 3B of 3A each as shown in FIG. 17, have a deflection by a value of one of the gaps 5, so that the door glass 4 easily moves outwardly from the vehicle body.

Figure 21:
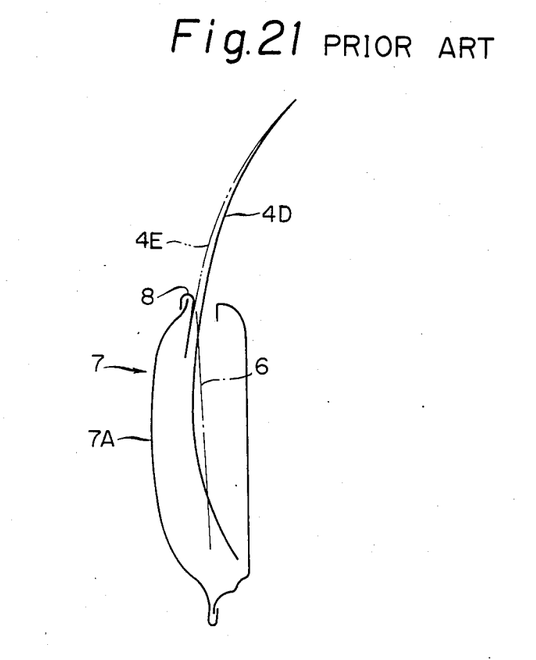
FIG. 21 is a schematic sectional view showing the relationship between the sliding path of the door glass and the plane of rotation of the arm of the window regulator in the door of a motor vehicle, to which the conventional door glass is applied.

Now, the cross-sectional shape of a door glass of a side door in a motor vehicle, particularly a passenger car, is normally a circularly arcuate shape, and a sliding path 4D of the door glass 4 has a circularly accuate shape as shown in FIG. 21 for example. In contrast thereto, a plane of rotation 6 of an arm, not shown, of a window regulator for raising or lowering the door glass 4 is a plane in the substantially vertical direction.

From the relationship between the sliding path 4D of the door glass 4 and the plane of rotation 6 of the arm of the window regulator as described above, in order to operate the window regulator smoothly, such an arrangement is adopted that, normally, at the central portion of a door body 7A of the door 7, the plane of rotation 6 of the window regulator is disposed inwardly in the widthwise direction of the vehicle body with respect to the sliding path 4D of the door glass 4 downwardly of a beltline 8 in the door 7, and, at the top and bottom portions of the door body 7A, the sliding path 4D of the door glass 4 is disposed inwardly in the widthwise direction of the vehicle body with respect to the plane of rotation 6 of the window regulator.

However, if the plane of rotation 6 of the window regulator and the sliding path 4D of the door glass 4 are arranged in the above-described positional relationship, then, when the door glass 4 is fully closed, the bottom portion of the door glass 4 is pushed outwardly in the proximity of the beltline 8.

More particularly, in the proximity of the beltline 8, the door glass 4 urges the outer lip 3A of the door glass run 3 against the outer surface portion 1A of the door frame 11 to deform the outer lip 3A as shown in FIG. 20.

The state of the door glass 4 in this case is indicated by a two-dot chain line 4E in FIG. 21.

When the door glass 4 is pushed outwardly by the window regulator when the door glass 4 is fully closed as described above, the contact pressure of the door frame 1 with either the outer lip 3A or the inner lip 3B is varied in the vertical direction of the door frame 1, thus presenting the disadvantage that the sealing performance of the door glass run 3 is lowered thereby.

Furthermore, in a motor vehicle of the type in which the radius of the circular area of the section of the door glass 4 is small, the outer surface of the door glass 4 may be bulged outwardly from the outer surface of the door frame 1 in some cases, thereby presenting the disadvantages that the appearance of the vehicle is deteriorated and the characteristics of aerodynamics is lowered during the running of the motor vehicle at high speed.

This trend is notable with a motor vehicle of a so-called flush surface type, in which the difference is small between the outer surfaces of the door frame 1 and the door glass 4.

Even when the door glass is displaced in the direction of the thickness thereof as described above and the forward end of the door glass is shifted from the center of the door glass run in the state immediately before the full closing of the door glass, as the means for introducing the forward end to the center of the door glass run, for example, there is a construction wherein the proximal end portion of the lip, to which the door glass is shifted, is obliquely extended and reinforced by an insert, as disclosed in West German DE 3106909A1, and another construction wherein the proximal end portion of the lip, to which the door glass is shifted, is formed of a hard material and extended obliquely, as disclosed in Japanese Patent Kokai (Laid-Open) No. 164420/83.

Furthermore, as the means for controlling a deformation value of the lip, for example, a portion of the side wall of the main body of a door glass run positioned on the rear surface of the lip of the door glass run is bulged in the direction of the thickness thereof and this bulged-out portion is caused to interfere with the rear surface of the lip so as to restrict the maximum displacement value of the lip, as disclosed in Japanese Utility Model Kokai (Laid-Open) No. 122366/84.

All of the above-described prior art require that the whole or a part of the construction of the door glass run have a sectional shape different from one in the ordinary construction of the door glass run, thus presenting the disadvantages from the viewpoints of the assembling to the door frame and the manufacturing cost.

To obviate the above-described disadvantages, applicant proposes a door construction in a motor vehicle, wherein a spacer is interposed in the rear of a lip of the door glass run, whereby the lip is not pushed outwardly in the widthwise direction thereof and deformed by the door glass.

In the above-described door construction of the motor vehicle, the aforesaid spacer is only elastically coupled in the rear of the lip, thereby presenting the disadvantages that it is difficult to position the spacer and in the case of the parts before being assembled to the door of the motor vehicle or during assembling work, a slight burr of the lip may cause the spacer to fall off.

In the above-described door construction of the motor vehicle, the aforesaid spacer is coupled in the rear of the lip and the lip is urged against the outer surface of the door glass, thereby presenting the disadvantage that the sliding resistance between the lip and the door glass is increased during the opening or closing of the door glass, to thereby increase the operation load of the window regulator.

SUMMARY OF THE INVENTION

It is therefore the primary object of the present invention to provide a construction of a door glass guide in a motor vehicle, wherein a spacer is partially interposed in gaps formed between the inner lip and the base portion of the door glass run and between the outer lip and the base portion so as to prevent the door glass from moving outwardly from the vehicle body, so that, even when the door glass is raised or lowered during the running of the motor vehicle at high speed, the upper side portion and the oblique portion of the door glass can run smoothly into the door glass run.

Another object of the present invention is to provide a construction of a door glass guide in a motor vehicle, wherein the door glass is not pushed outwardly from the vehicle body by the window regulator when the door glass is fully closed.

A further object of the present invention is to provide a construction of a door glass guide in a motor vehicle, wherein the spacer can be easily positioned with respect to the door glass run and cannot fall off easily.

A still further object of the present invention is to provide a construction of a door glass guide in a motor vehicle the sliding resistance increase of a spacer is low during the opening or closing of the door glass.

To the above end, the present invention contemplates that in a construction of a door glass guide for a motor vehicle, comprising a door glass run having a main body secured to a guide portion of a door frame and being opposed to an end edge of a door glass and a lip. The lip extends from an end portion of the body and is directed toward and is in sliding contact with the door glass, a spacer extending over a minor longitudinal portion of the door glass run and disposed between the lip and the main body of the door glass run for regulating the deformation of the lip in a direction transverse of the door glass run.

To the above end, the present invention contemplates a door glass run having a base portion being of a U-shape in cross section and coupled into the upper side portion and the oblique side portion of a door frame. A spacer is interposed between the base portion and the outer lip of the door glass run in the proximity of the position where the upper ends of the forward side edge and the rear side edge of the door glass are located, respectively. Another spacer is interposed between the base portion and the inner lip of the door glass run in the proximity of the position where the lower ends of the forward side edge and the rear side edge of the door glass are located, respectively.

To the above end, the present invention contemplates a door glass guide for a motor vehicle, wherein a spacer is interposed in the rear of a lip of a door glass run, whereby the lip is not pushed outwardly in the transverse direction thereof and deformed by the door glass. The door glass run has a main body secured to a guide portion of a door frame in a door of a motor vehicle and being opposed to an end edge of the door glass and a lip. The lip extends fron an end portion of the body and is directed toward and in sliding contact with the door glass and guiding the door glass in the opening or closing direction. A spacer extends over a minor longitudinal portion of the door glass run and is disposed between one lip and the main body of the door glass run for regulating deformation of the lip outwardly of the vehicle and transversely of the door glass run. The spacer is located in the proximity of the door beltline of the door glass run provided on the longitudinal side of the door frame and extends over a minor longitudinal portion of the door glass run and is disposed between the lip and the main body of the door glass.

To the above end, the present invention contemplates that a spacer is disposed in the rear of the outer lip of the door glass run provided on the upper side of the door frame.

According to the present invention, the spacer is disposed in the rear of the outer lip, which is located at a position close to the door beltline, of the door glass run provided on the longitudinal side of the door frame, so that the door glass can be prevented from being displaced outwardly by a window regulator.

To the above end, the present invention contemplates that a positioning rib is projected from a portion of the spacer, which is brought into contact with the main body of the door glass run and a positioning hole for receiving the positioning rib is formed in the main body of the door glass run in opposed relationship to the positioning rib.

To the above end, the present invention contemplates that a pawl penetrating through and projecting out of the positioning hole and spreading in the lateral direction is integrally formed with the forward end of the positioning rib.

According to the present invention, the positioning rib integrally formed on the spacer is received in the positioning hole formed in the door glass run, so that the spacer can be reliably positioned and prevented from falling off.

To the above end, the present invention contemplates that chamfering is applied to at least one of end portions in the moving direction of the door glass, of a surface of the spacer, which is in contact with the rear surface of the lip of the door glass run.

According to the present invention, chamfering is applied to an end portion or portions in the opening or closing direction of the door glass, of the surfaces of the spacer, which are in contact with the lip of the door glass run, whereby the area of the spacer contacting the lip is reduced, so that the sliding resistance of the lip can be lowered during the opening or closing of the door glass.

PREFERRED EMBODIMENTS OF THE INVENTION

Description will hereunder be given of embodiments of the present invention with reference to the drawings.

Figure 1:
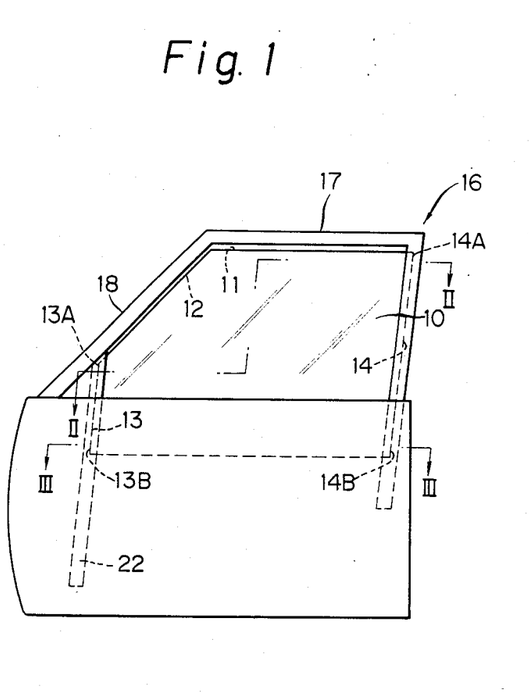
FIG. 1 is a side view of a door of a motor vehicle, showing the state of the upper side edge and oblique edge of the door glass immediately before the edges run into the door glass run.
Figure 2:
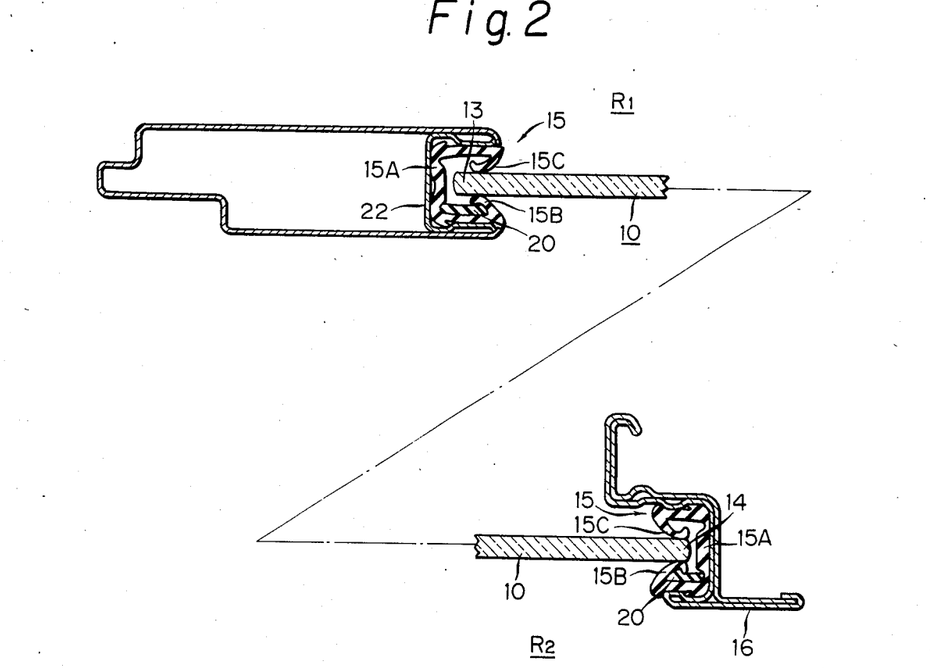
FIG. 2 is a sectional view corresponding to the line II—II in FIG. 1, showing an embodiment of the door construction in a motor vehicle according to the present invention

FIG. 1 shows a state where an upper side edge 11 and an oblique edge 12 of the door glass 10 are positioned immediately before the edges 11 and 12 run into a door glass run 15, as shown in FIG. 2 coupled into an upper side portion 17 and an oblique side portion 18 of a door frame 16.

With the door glass 10 being positioned as described above, a spacer 20 is interposed between a base portion 15A and an outer lip 15B of the door glass run 15 within a limited scope of the door glass run 15 in the proximity of a position where there are positioned an upper end 13A of a forward side edge 13 and an upper end 14A of a rear side edge 14 of the door glass 10, as shown in FIG. 2.

Figure 3:
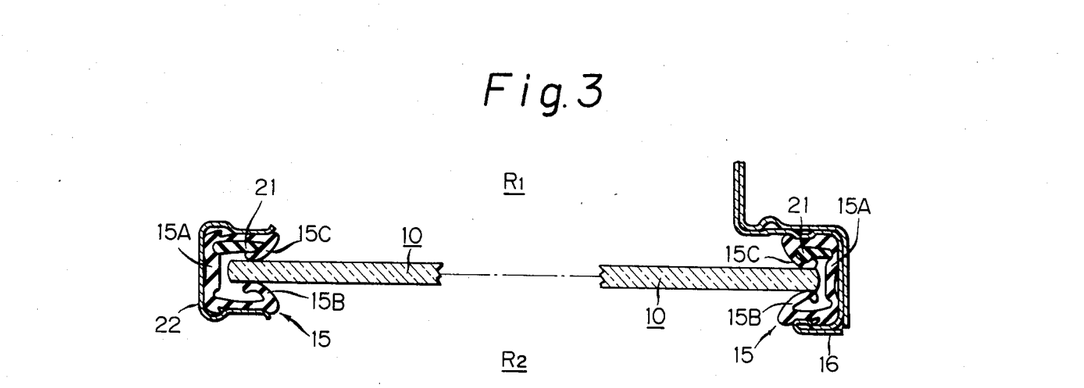
FIG. 3 is a sectional view showing the portion corresponding to the line III—III in FIG. 1 in the above embodiment.

Furthermore, with the door glass 10 being positioned as described above, a spacer 21 is interposed between the base portion 15A and an inner lip 15C of the door glass run 15 within a limited scope of the door glass run 15 in the proximity of a position where there are positioned a lower end 13B of the forward side edge 13 and a lower end 14B of the rear side edge 14 of the door glass 10, as shown in FIG. 3.

The spacers 20 and 21 are preferably formed of a material having a low deflection, such as solid rubber or synthetic resin.

According to this embodiment, in the state where the upper side edge 11 and the oblique edge 12 of the door glass 10 are positioned immediately before the edges 11 and 12 run into the door glass run 10 coupled in the upper side portion 17 and the oblique side portion 18 of the door frame 16, the edges 11 and 12 can be prevented from moving outwardly from the vehicle body by the spacers 20 and 21.

Designation 22 shows a guide portion of the door frame 16, R1 and R2 shows an inner side and an outer side of the door glass 10, respectively.

According to the present invention, even when the door glass 10 is raised or lowered during the running of the motor vehicle at high speed, the upper side edge 11 and the oblique edge 12 of the door glass 10 can be made to run smoothly into the door glass run 15.

Description will hereunder be given of the second embodiment of the present invention with reference to the drawings.

Figure 4:
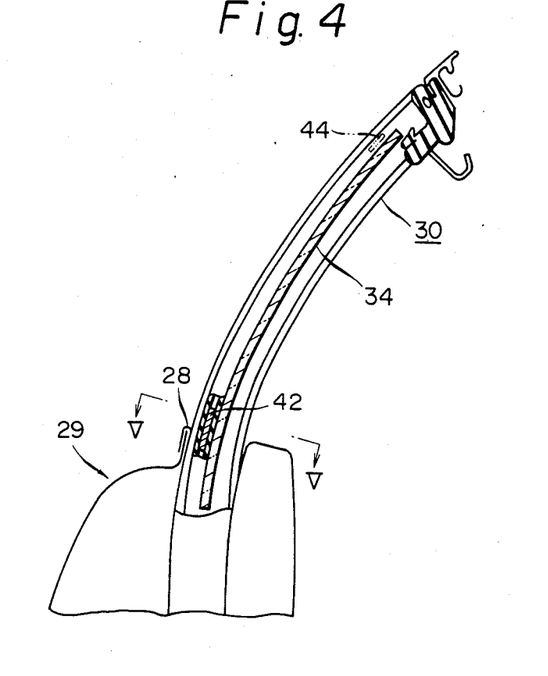
FIG. 4 is a schematic sectional view showing a second embodiment of the construction of the door glass guide in a motor vehicle according to the present invention.
Figure 5:
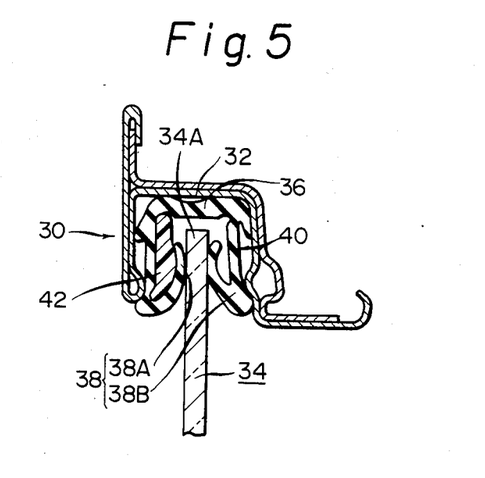
FIG. 5 is an enlarged sectional view taken along the line V—V in FIG. 4.

As shown in FIGS. 4 and 5, according to this embodiment, in a construction of a door glass guide in a motor vehicle, comprising: a door glass run 40 including a main body 36 in as door 29 of a motor vehicle, being opposed to an end edge 34A of the door glass 34 and lips 38, which are extending from end portions directed to the center of the door glass 34 toward the center of the main body 36 of the door glass run in the widthwise direction thereof and toward the outer periphery of the door frame 30, being in sliding contact with the glass surfaces at the end edge 34A of the door glass 34, and guiding the door glass 34 in the opening or closing direction; and a spacer 42 being opposed to at least a portion of the door glass run 40 in the longitudinal direction thereof, disposed between the lip 38 and the main body 36 of the door glass run in the rear of the lip 38 in the direction of the thickness of the door glass 34, and regulating the deformation of the lip 38 outwardly in the widthwise direction of the door glass run 40; the spacer 42 is disposed in the rear of an outer lip 38A, which is located at a position close to a door beltline 28, of the door glass run 40 provided on the longitudinal side 30A of the door frame 30.

The lips 38 comprises the outer lip 38A being in contact with the outer surface of the door glass 34 and an inner lip 38b being in contact with the compartment's side surface of the door glass 34.

Furthermore, the main body 36 of the door glass run is of a generally U-shape in cross section and the U-shape is respectively, integrally formed at the forward ends on the side of the opening thereof with the outer lip 38A and the inner lip 38B, as shown in the drawing.

In this embodiment, the spacer 42 is disposed in the rear of the outer lip 38A at a position close to the door beltline in the door glass run 40 provided on the longitudinal side 30 of the door frame 30, so that, even if the door glass 34 is subjected to a force of pushing the door glass 34 outwardly by the window regulator when the door glass 34 is fully closed, the door glass 34 can be prevented from being displaced outwardly (Refer to FIG. 5).

In consequence, the door glass 34 is in contact with the outer lip 38A and the inner lip 38B of the door glass run 40 uniformly in the vertical direction of the door frame, so that the sealing performance can be prevented from being lowered by the door glass run 40.

Furthermore, the outward bulging of the door glass 34 is regulated, so that the appearance of the motor vehicle and the characteristics of aerodynamics can be prevented from lowering when the door glass 34 is fully closed.

Here, in the above embodiment, the spacer 42 has been mounted to the door glass run 40 at the position close to the door beltline. However, in order to further reliably control the door glass 34 from being displaced outwardly, a spacer 44 may be disposed in the rear of the outer lip 38A of the glass run 40 provided on the upper side 30B of the door frame 30, as indicated by two-dot chain lines in FIG. 4.

Additionally, in the above embodiment, the main body 40A of the door glass run 40 has been formed into the generally U-shape in cross section, however, the present invention need not necessarily be limited to this, and the main body of the door glass run may be formed into other shapes, such as an L-shape.

The present invention with the above arrangement can offer such an outstanding advantage that the door glass 34 can be reliably prevented from being pushed outwardly by the window regulator when the door glass 34 is fully closed.

Description will hereunder be given of the third embodiment of the present invention with reference to the drawings.

Figures 6, 7, 8:
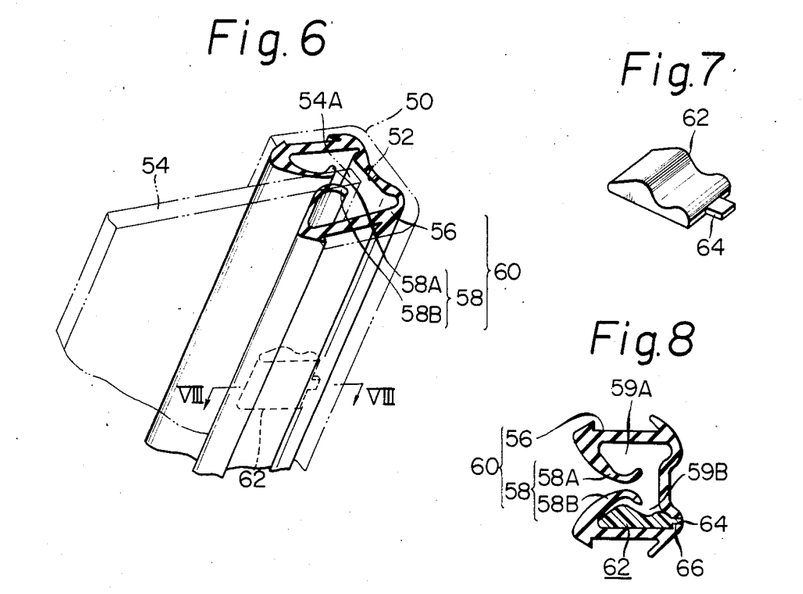
FIG. 6 is a perspective view showing a third embodiment of the construction of the door glass guide in a motor vehicle according to the present invention.
FIG. 7 is a perspective view showing the spacer in the third embodiment.
FIG. 8 is a sectional view taken along the line VIII—VIII in FIG. 6.

As shown in FIGS. 6 through 8, according to this embodiment, in a construction of a door glass guide in a motor vehicle, comprising: a door glass run 60 including a main body 56 of the door glass run secured to a guide portion 52 of a door frame 50 in a door, not shown, of a motor vehicle, being opposed to an end edge 54A of the door glass 54 and lips 58, which are extending from end portions directed to the center of the door glass 54 toward the center of the main body 56 of the door glass run 60 in the widthwise direction thereof and toward the outer periphery of the door frame 50, being in sliding contact with the glass surfaces at the end edge 54A of the door glass 54, and guiding the door glass 54 in the opening or closing direction; and a spacer 62 being opposed to at least a portion of the door glass run 60 in the longitudinal direction thereof, disposed between the lip 58 and the main body 56 of the door glass run in the rear of the lip 58 in the direction of the thickness of the door glass 54, and regulating the deformation of the lip 58 outwardly in the widthwise direction of the door glass run 60; a positioning rib 64 is projected from a portion of the spacer 62, which is brought into contact with the main body 56 of the door glass run and a positioning hole 66 for receiving the positioning rib 64 is formed in the main body 56 of the door glass run in opposed relationship to the positioning rib 64.

The lips 58 comprise an outer lip 58A being in contact with the outer surface of the door glass 54 and an inner lip 58B being in contact with the compartment's side surface of the door glass 54.

Furthermore, the main body 56 of the door glass run is of a generally U-shape in cross section and the U-shape is respectively, integrally formed at the forward ends on the side of the opening thereof with the outer lip 58A and the inner lip 58B, as shown in the drawing.

The process of mounting the spacer 62 to the door glass run 60 includes the steps of pulling up the outer lip 58A or the inner lip 58B on the mounting side, inserting and coupling the positioning rib 64 of the spacer 62 into the positioning hole 66 formed in the main body 56 of the door glass run, and restoring the outer lip 58A or the inner lip 58B, which has been pulled up, to the original position, thus completing the process.

In this embodiment, the positioning rib 64 of the spacer 62 is inserted and coupled into the positioning hole 66 formed in the main body 56 of the door glass run, so that the positioning of the door glass run 60 in the longitudinal direction can be reliably carried out.

Even if the outer lip 58A or the inner lip 58B is pulled up during the conveyance or the assembling operation, the lengths in the direction of the spacers 62 of in spaces 59A and 59B formed inside the outer lip 58A and the inner lip 58B are each shorter than the spacer 62 having no positioning rib 64 by the length of the positioning rib 64, so that the spacer 62 cannot fall down unless the outer lip 58A or the inner lip 58B is turned over to a great extent.

Figure 9:
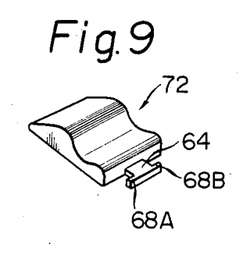
FIG. 9 is a perspective view showing the spacer in a fourth embodiment of the present invention.
Figure 10:
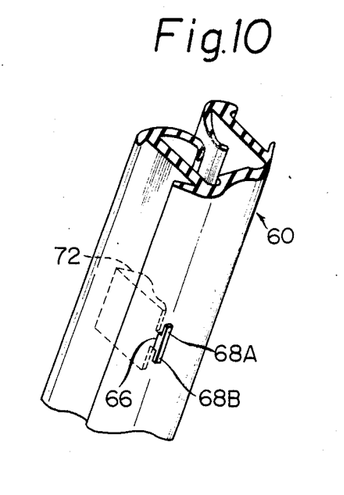
FIG. 10 is a perspective view similar to FIG. 6, showing the fourth embodiment.

Description will hereunder be given of the fourth embodiment of the present invention as shown in FIGS. 9 and 10.

The spacer 72 in this fourth embodiment is constructed such that the positioning rib 64 has a length of penetrating through the main body 56 of the door glass run and projecting to the other side, and the projecting end portion is formed with pawls 68A and 68B, which are extending in directions opposite to each other.

As compared with the third embodiment, in this fourth embodiment, the fall-off of the spacer is further reliably prevented, and particularly, even if the outer lip 58A or the inner lip 58B is pulled up and turned over, the fall-off is prevented.

Figure 11:
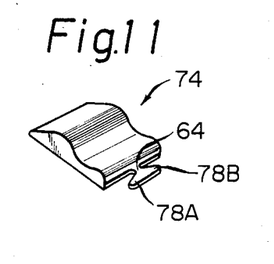
FIG. 11 is a perspective view showing the spacer in a fifth embodiment of the present invention.

Here, the spacer 72 in the fourth embodiment as shown in FIGS. 9 and 10 has been formed at the forward end portion of the positioning rib 64 thereof with the pair of pawls 68A and 68B extending in the direction perpendicularly intersecting the longitudinal axis of the positioning rib 64, however, the pawls of the present invention need not necessarily be limited to this shapes, and pawls 78A and 78B, formed into substantially triangular shapes, may be provided as in a spacer 74 according to the third embodiment shown in FIG. 11 for example.

Additionally, in the above embodiment, the positioning rib 64 of the spacer 62, 72 or 74 has been inserted and coupled into the positioning hole 66 formed in the base portion 56A of the main body 56 of the door glass run being of the generally U-shape in cross section, however, the present invention need not necessarily be limited to this, and the positioning rib of the spacer may be inserted and coupled into one of holes formed in a pair of side portions 56B of the main body 56 of the door glass run being of the generally U-shape in cross section.

Furthermore, in the above embodiment, the main body of the door glass run has been formed into the generally U-shape in cross section, however, the present invention need not necessarily be limited to this, and any other shape such as an L-shape may be adopted.

The present invention with the above-described arrangement can offer such an outstanding advantage that the positioning of the spacer can be easily and reliably performed and the spacer can be prevented from falling off from the door glass run.

Description will hereunder be given of the fifth embodiment of the present invention with reference to the drawings.

Figure 12:
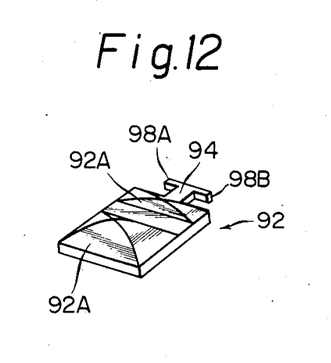
FIG. 12 is a perspective view showing a sixth embodiment of the present invention.
Figure 13:
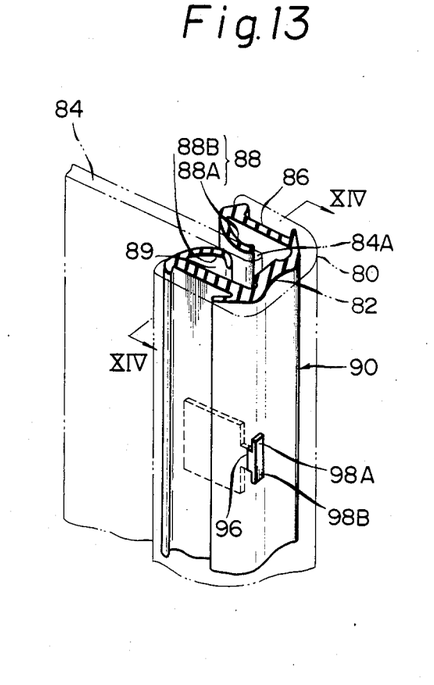
FIG. 13 is a perspective view showing the state where the spacer is mounted to the door glass run in the above embodiment.
Figure 14:
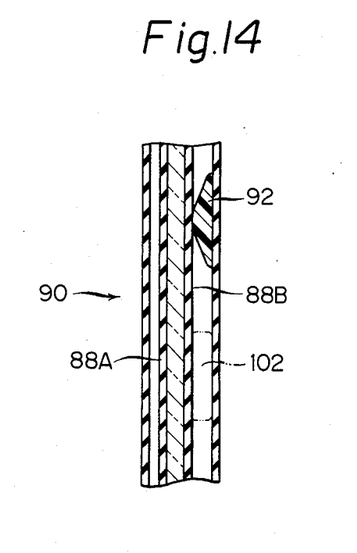
FIG. 14 is a sectional view taken along the line XIV—XIV in FIG. 13.

As shown in FIGS. 12 through 14, according to this embodiment, in the spacer 92 for the door glass run 90, being opposed at least a portion of the door glass run 90 in the longitudinal direction thereof, disposed between the lip 88 and the main body 16 of the door glass run in the rear of the lip 88 in the direction of the thickness of the door glass 84, and regulating the deformation of the lip 88 outwardly in the widthwise direction of the door glass run 90, in the door glass run 90 including the main body 86 of the door glass run secured to the guide portion 82 of the door frame 80 in the door, not shown, of a motor vehicle, being opposed to the end edge 84A of the door glass 84 and lips 88, which are extending from the end portions directed to the center of the door glass 84 toward the center of the main body 86 of the door glass run in the widthwise direction thereof and toward the outer periphery of the door frame 86, being in sliding contact with the glass surfaces at the end edge 84A of the door glass 84, and guiding the door glass 84 in the opening or closing direction, chamfering is applied to opposite end portions in the moving direction of the door glass 84, of spacer 92, which is in contact with the rear surface of the lip 88 of the door glass run 90.

Here, the spacer 92 is formed into two continuous wave shapes in cross section, which substantially correspond to the sectional shape of an inner space 89 in the rear of the lip 88 of the door glass run 90, and chamfering is applied to the opposite ends of the spacer 92 in a direction perpendicularly intersecting the aforesaid cross section, namely, the moving direction of the door glass 84 (the longitudinal direction of the door glass run), whereby two generally pyramidal raised portions, large and small, 92A and 92B are formed.

The positioning rib 94 is projectingly provided on a portion of the spacer being in contact with the main body 86 of the door glass run and the positioning hole 96 for receiving the positioning rib 94 is formed in the main body 86 of the door glass run in opposed relationship to the positioning rib 94.

Reference numerals 98A and 98B indicate pawls for locking against dislodging, which are integrally formed on the forward end portion of the rib 94 and projecting in a direction perpendicularly intersecting the longitudinal axis of the positioning rib 94.

The lips 18 comprise an outer lip 88A being in contact with the outer surface of the door glass 84 and an inner lip 88B being in contact with the compartment's side surface of the door glass 84.

Furthermore, the main body 86 of the door glass run is of a generally U-shape in cross section and the U-shape is respectively, integrally formed at the forward ends on the side of the opening thereof with the outer lip 88A and the inner lip 88B, as shown in the drawing.

The process of mounting the spacer 92 to the door glass run 90 includes the steps of pulling up the outer lip 88A or the inner lip 88B on the mounting side, inserting and coupling the positioning rib 94 of the spacer 92 into the positioning hole 96 formed in the main body 86 of the door glass run, and restoring the outer lip 88A or the inner lip 88B, which has been pulled up, to the original position, thus completing the process.

In this embodiment, since the raised portions 92A and 92B of the spacer 92, which are in contact with the rear surface of the lip, are chamfered at the opposite ends thereof in the moving direction of the door glass 84, the raised portions 22A and 22B are formed into two generally pyramidal shapes. In consequence, as shown in FIG. 14, the raised portion 92A and 92B are in point-to-point contact with the rear surface of the lip 88, whereby the sliding resistance of the lip 88 to the door glass 84 during the opening or closing operation of the door glass 84 can be reduced.

In the case of no chamfering, line-to-line contact is brought about by the spacer 102 indicated by two-dot chain lines in FIG. 14.

Furthermore, the positioning rib 94 of the spacer 92 is inserted and coupled into the positioning hole 96 of the main body 86 of the door glass run, so that the positioning of the door glass run 90 in the longitudinal direction can be reliably carried out.

Even if the outer lip 88A or the inner lip 88B is pulled up during the conveyance or the assembling operation, the lengths in the longitudinal direction of the spacers 92 of spaces 89A and 89B formed inside the outer lip 88A and the inner lip 88B are each shorter than the spacer 92 having no positioning rib 94 by the length of the positioning rib 94, so that the spacer 92 cannot fall off unless the outer lip 88A or the inner lip 88B is turned over to a great extent.

Particularly, the spacer 92 is constructed such that the positioning rib 94 has a length of penetrating through the main body 86 of the door glass run and projecting to the other side, and the thus projecting end portion is formed with pawls 98A and 98B, which are extending in directions opposite to each other, so that, even if the outer lip 88A or the inner lip 88B is pulled up and turned over, the fall-off of the spacer 92 can be prevented.

Figure 15:
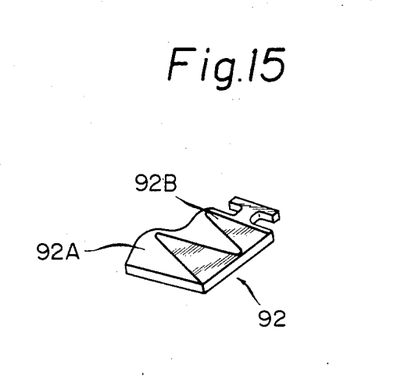
FIG. 15 is a perspective view similar to FIG. 12, showing a seventh embodiment of the present invention.

Additionally, in the above embodiment, the raised portions 92A and 92B of the spacer 92 are chamfered at the opposite ends thereof in the moving direction of the door glass 84 and formed into the generally pyramidal shapes, however, the present invention need not necessarily be limited to this, and such an arrangement may be adopted that the raised portions 92A and 92B may be ones which are substantially in point-to-point contact with the rear surface of the lip 88 due to the chamfering, and consequently, the chamfering may be applied to only one side as shown in FIG. 15.

Furthermore, the spacer 92 has been formed with the two raised portions, large and small, 92A and 92B, however, the present invention need not necessarily be limited to this, and the spacer 92 may have one of the raised portions, namely, only 92A, for example.

The present invention with the above-described arrangement can offer such an advantage that the sliding resistance of the lips of the door glass run due to the mounting of the spacer during the opening or closing operation of the door glass can be reduced.

What is claimed is:

1. A door glass guide for a motor vehicle, comprising a door glass run having a main body secured to a guide portion of a door frame and being opposed to an end edge of a door glass and a lip, said lip extending from an end portion of said body and directed toward and being in sliding contact with the door glass, a spacer extending over a minor longitudinal portion of the door glass run and disposed between the lip and the main body of the door glass run for regulating deformation of the lip in a direction transverse of the door glass run.

2. A construction of a door glass guide in a motor vehicle as set forth in claim 1, wherein chamfering is applied to at least one end portion of said spacer in the moving direction of said door glass.

3. A construction of a door glass guide in a motor vehicle as set forth in claim 1, wherein a positioning rib is projectingly provided on a portion of said spacer being in contact with the main body of the door glass run and a positioning hole for receiving said positioning rib is formed in the main body of the door glass run in opposed relationship to said positioning rib, with said rib being inserted and coupled into said position hole.

4. A construction of a door glass guide in a motor vehicle as set forth in claim 3, wherein chamfering is applied to at least one end portion of said spacer in the moving direction of said door glass.

5. A construction of a door glass guide in a motor vehicle as set forth in claim 3, wherein pawls penetrating through said positioning hole and spreading in the lateral directions are integrally formed on a forward end of said positioning rib.

6. A construction of a door glass guide in a motor vehicle as set forth in claim 5, wherein chamfering is applied to at least one end portion of said spacer in the moving direction of said door glass.

7. In a door in a motor vehicle, wherein said door has a door glass run including a base portion being of a U-shape in cross section and coupled into a door frame, said run having an inner lip being in sliding contact with an inside surface of a slidable door glass and an outer lip being in sliding contact with an outside surface of said door glass, said lips extending obliquely inwardly, a forward side edge of said door glass slidable in a portion of the door glass run coupled into a front side portion of the door frame, a rear side edge of said door glass vertically slidable in a portion of the door glass run coupled into a rear side portion of said door frame, and an upper side edge and an oblique edge of said door glass adapted to run into the door glass run at portions coupled into an upper side portion and an oblique side portion of said door frame when said door glass is raised to the highest position, the improvement comprising a spacer interposed between the base portion and the outer lip of the door glass run in the proximity of a position where the upper ends of the forward side edge and the rear side edge of said door glass are located, respectively, and another spacer interposed between the base portion and the inner lip of the door glass run in the proximity of a position where the lower ends of the forward side edge and the rear side edge of said door glass are located, respectively.

8. A construction of a door glass guide in a motor vehicle as set forth in claim 7, wherein chamfering is applied to at least one end portion of said spacer in the moving direction of said door glass.

9. A construction of a door glass guide in a motor vehicle as set forth in claim 7, wherein a positioning rib is projectingly provided on a portion of said spacer being in contact with the main body of the door glass run and a positioning hole for receiving said positioning rib is formed in the main body of the door glass run in opposed relationship to said positioning ribs, with said rib being inserted and coupled into said positioning hole.

10. A construction of a door glass guide in a motor vehicle as set forth in claim 9, wherein chamfering is applied to at least one end portion of said spacer in the moving direction of said door glass.

11. A construction of a door glass guide in a motor vehicle as set forth in claim 9, wherein pawls penetrating through said positioning hole and spreading in the lateral directions are integrally formed on a forward end of said positioning rib.

12. A construction of a door glass guide in a motor vehicle as set forth in claim 11, wherein chamfering is applied to at least one end portion of said spacer in the moving direction of said door glass.

13. A door glass guide for a motor vehicle, comprising a door glass run having a main body secured to a guide portion of a door frame in a door of a motor vehicle and being opposed to an end edge of a door glass and a lip, said lip extending from an end portion of said body and directed toward and being in sliding contact with the door glass and guiding the door glass in the opening and closing directions, a spacer extending over a minor longitudinal portion of the door glass run and disposed between the lip and the main body of the door glass run for regulating deformation of the lip outwardly of the vehicle and transversely of the door glass run, said spacer being located in proximity of a door beltline of the door glass run provided on a longitudinal side of said door frame.

14. A construction of a door glass guide in a motor vehicle as set forth in claim 13, wherein chamfering is applied to at least one end portion of said spacer in the moving direction of said door glass.

15. A construction of a door glass guide in a motor vehicle as set forth in claim 13, wherein a spacer is located on an upper side of said door frame and extends over a minor longitudinal portion of the door glass run and is disposed between the lip and the main body of the door glass.

16. A construction of a door glass guide in a motor vehicle as set forth in claim 15, wherein chamfering is applied to at least one end portion of said spacer in the moving direction of said door glass.

17. A construction of a door glass guide in a motor vehicle as set forth in claim 15, wherein a positioning rib is projectingly provided on a portion of said spacer being in contact with the main body of the door glass run and a positioning hole for receiving said positioning rib is formed in the main body of the door glass run in opposed relationship to said positioning rib, with said rib being inserted and coupled into said positioning hole.

18. A construction of a door glass guide in a motor vehicle as set forth in claim 17, wherein chamfering is applied to at least one end portion of said spacer in the moving direction of said door glass.

19. A construction of a door glass guide in a motor vehicle as set forth in claim 17, wherein pawls penetrating through said positioning hole and spreading in the lateral directions are integrally formed on a forward end of said positioning rib.

20. A construction of a door glass guide in a motor vehicle as set forth in claim 19, wherein chamfering is applied to at least one end portion of said spacer in the moving direction of said door glass.

21. A construction of a door glass guide in a motor vehicle as set forth in claim 13, wherein a positioning rib is projectingly provided on a portion of said spacer being in contact with the main body of the door glass run and a positioning hole for receiving said positioning rib is formed in the main body of the door glass run in opposed relationship to said positioning rib with said rib being inserted and coupled into said positioning hole.

22. A construction of a door glass guide in a motor vehicle as set forth in claim 21, wherein chamfering is applied to at least one end portion of said spacer in the moving direction of said door glass.

23. A construction of a door glass guide in a motor vehicle as set forth in claim 7, wherein pawls penetrating through said positioning hole and spreading in the lateral directions are integrally formed on a forward end of said positioning rib.

24. A construction of a door glass guide in a motor vehicle as set forth in claim 23, wherein chamfering is applied to at least one end portion of said spacer in the moving direction of said door glass.

* * * * *